(12) United States Patent
Hirota et al.

(10) Patent No.: US 12,536,745 B2
(45) Date of Patent: Jan. 27, 2026

(54) THREE-DIMENSIONAL POINT CLOUD DATA PROCESSING SYSTEM

(71) Applicant: OKUMA Corporation, Aichi (JP)

(72) Inventors: Shigemoto Hirota, Aichi (JP); Akihito Kataoka, Aichi (JP); Takayuki Otomo, Aichi (JP)

(73) Assignee: OKUMA CORPORATION, Niwa-Gun (JP)

( * ) Notice: Subject to any disclaimer, the term of this patent is extended or adjusted under 35 U.S.C. 154(b) by 226 days.

(21) Appl. No.: 18/356,737

(22) Filed: Jul. 21, 2023

(65) Prior Publication Data

US 2024/0029355 A1 Jan. 25, 2024

(30) Foreign Application Priority Data

Jul. 25, 2022 (JP) .................................. 2022-118246

(51) Int. Cl.
*G06T 17/10* (2006.01)
*G06T 5/70* (2024.01)

(52) U.S. Cl.
CPC ................ *G06T 17/10* (2013.01); *G06T 5/70* (2024.01)

(58) Field of Classification Search
None
See application file for complete search history.

(56) References Cited

U.S. PATENT DOCUMENTS

| 10,319,080 B2* | 6/2019 | Kim ......................... G06T 5/70 |
| 11,361,461 B2* | 6/2022 | Oh ............................ G06T 7/60 |
| 2015/0108689 A1 | 4/2015 | Polk, Jr. et al. |
| 2020/0202175 A1 | 6/2020 | Hieida et al. |

FOREIGN PATENT DOCUMENTS

| JP | 2005024370 A | 1/2005 |
| JP | 2005208868 A | 8/2005 |
| JP | WO2018020954 A1 | 4/2019 |
| JP | 2020144686 A | 9/2020 |
| WO | 2015061400 A1 | 4/2015 |
| WO | 2016139819 A1 | 9/2016 |

OTHER PUBLICATIONS

JPO Notice of Reasons for Refusal for corresponding JP Application No. 2022-118246; Issued Jul. 22, 2025.

* cited by examiner

*Primary Examiner* — Kee M Tung
*Assistant Examiner* — Biao Chen
(74) *Attorney, Agent, or Firm* — CANTOR COLBURN LLP

(57) ABSTRACT

A three-dimensional point cloud data processing system includes: one or more cameras that image an object to acquire one or more items of brightness information; and a controller that calculates point cloud data of the object from the one or more items of brightness information. The controller calculates at least one bounding box (BB), which surrounds the object and is formed by combining one or more rectangles, from at least one of the one or more items of brightness information, and calculates the point cloud data based on the at least one BB and the one or more items of brightness information.

5 Claims, 13 Drawing Sheets

THREE-DIMENSIONAL POINT CLOUD DATA PROCESSING SYSTEM

CROSS REFERENCE TO RELATED APPLICATION

The present invention claims priority under 35 U.S.C. § 119 to Japanese Patent Application No. 2022-118246 filed on Jul. 25, 2022, the entire content of which is incorporated herein by reference.

TECHNICAL FIELD

The present specification discloses a three-dimensional point cloud data processing system that generates three-dimensional point cloud data indicating the three-dimensional shape of an object from image data obtained by imaging the object.

BACKGROUND

In recent years, techniques have been proposed for generating three-dimensional point cloud data (hereinafter abbreviated as "point cloud data") indicating the three-dimensional shape of an object based on image data obtained by imaging the object. Such point cloud data can be used, for example, in a machine tool to measure the three-dimensional shape of a workpiece, and the results of this shape measurement can be used to detect interference between the tool and the workpiece, generate a tool path, measure machining accuracy, and determine the presence or absence of an object.

Incidentally, when generating point cloud data, point data obtained by extracting points indicating the surface of an object from image data (hereinafter, point data extracted from image data is referred to as "primary point data") is transformed into the world coordinate system (only one coordinate system per system; for example, a machine coordinate system or a work coordinate system in the case of a machine tool). However, the primary point data extracted from the image data includes many points unrelated to the object, that is, a lot of noise. When there is a large amount of such noise, the shape of the object cannot be accurately grasped, and the data size becomes very large. For this reason, many techniques for removing noise from the point cloud data have been proposed.

For example, JP 2020-144686 A discloses a technique of storing design shape data of an object in advance, comparing the design shape data with point cloud data, and removing noise from the point cloud data.

In addition, WO 2015/061400 proposes a technique of creating an XZ cross-sectional view from point cloud data, estimating a stratum surface from the XZ cross section, and removing points below the stratum as noise. In addition, JP 2005-024370 A discloses a technique of rotating point cloud data, determining a stratum surface from the rotated data, and removing a point cloud with a large standard deviation from the stratum surface as noise.

CITATION LIST

PATENT LITERATURE 1: JP 2020-144686 A
PATENT LITERATURE 2: WO 2015/061400
PATENT LITERATURE 3: JP 2005-024370 A

However, in the technique disclosed in JP 2020-144686 A, it is necessary to have design shape data in advance, and it is difficult to generate point cloud data for an object without design shape data. In addition, in the techniques disclosed in WO 2015/061400 and JP 2005-024370 A, there is a problem that noise removal processing takes a long time because the amount of calculation for estimating the stratum and calculating the standard deviation increases.

Therefore, the present specification discloses a three-dimensional point cloud data processing system capable of generating point cloud data with a smaller amount of calculation.

SUMMARY

A three-dimensional point cloud data processing system disclosed in the present specification includes: one or more imaging devices that image an object to acquire one or more items of brightness information; and a controller that calculates three-dimensional point cloud data of the object from the one or more items of brightness information. The controller calculates at least one BB (bounding box), which surrounds the object and is formed by combining one or more rectangles, from at least one of the one or more items of brightness information, and calculates the three-dimensional point cloud data based on the at least one BB and the one or more items of brightness information.

In this case, the one or more items of brightness information may include first brightness information obtained by imaging the object from a first direction and second brightness information obtained by imaging the object from a second direction different from the first direction.

In addition, the controller may calculate a second BB surrounding the object and a second BB push-out space, which is obtained by pushing out the second BB in the second direction, from the second brightness information, and remove, as noise, points located outside the second BB push-out space among points calculated from the first brightness information.

In addition, the one or more items of brightness information may include the first brightness information obtained by imaging the object from a first direction. The controller may calculate a first BB surrounding the object based on the first brightness information, remove, as noise, pixel values located outside the first BB among a plurality of pixel values forming the first brightness information, and calculate the three-dimensional point cloud data based on the first brightness information after noise removal.

In addition, the controller may function as an AI that is machine-trained in advance to receive at least the at least one BB and the one or more items of brightness information as its inputs, and output information indicating presence or absence of an effective point in each of a plurality of pixels forming the one or more items of brightness information.

In addition, the controller may function as an AI that is machine-trained in advance to receive at least the at least one BB and the one or more items of brightness information as its inputs, and output information indicating presence or absence of an effective point in each of a plurality of grid spaces formed by dividing a three-dimensional space in a 3D matrix.

In addition, the one or more items of brightness information may further include one or more items of additional brightness information. The controller may calculate the three-dimensional point cloud data based on one or more additional BBs calculated from the one or more items of additional brightness information, the second BB, and the first brightness information.

According to the technique disclosed in this specification, a BB obtained by combining one or more rectangles has a simple shape, and the amount of calculation is small. By generating the point cloud data based on the BB and the brightness information, it is possible to generate the point cloud data with a smaller amount of calculation.

BRIEF DESCRIPTION OF DRAWINGS

Embodiment(s) of the present disclosure will be described based on the following figures, wherein.

DESCRIPTION OF EMBODIMENTS

Embodiments

Figure 1:
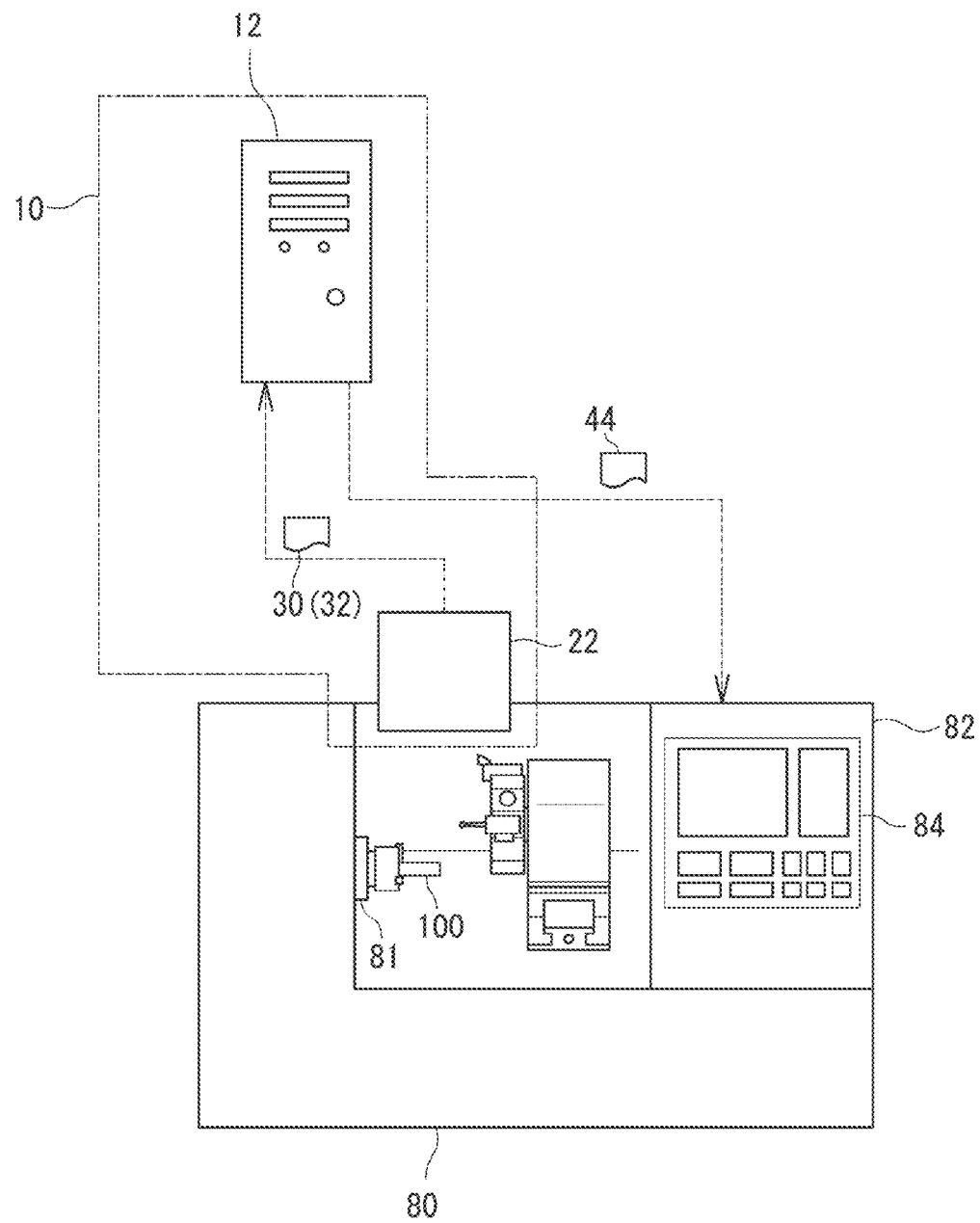
FIG. 1 is a schematic diagram showing the configuration of a three-dimensional point cloud data processing system.

Hereinafter, the configuration of a three-dimensional point cloud data processing system 10 will be described with reference to the diagrams. FIG. 1 is a schematic diagram showing the configuration of the three-dimensional point cloud data processing system 10. In the example of FIG. 1, the three-dimensional point cloud data processing system 10 is used in combination with a machine tool 80.

The machine tool 80 performs predetermined processing on a workpiece in order to manufacture a processed product. Although the type of the machine tool 80 is not particularly limited, the machine tool 80 may be, for example, a metal processing machine that performs metal processing (for example, cutting or pressing) on a metal workpiece. In FIG. 1, the machine tool 80 is a lathe having a spindle 81 and a tool rest. In the following description, a workpiece handled by this machine tool 80 is treated as an object 100 for shape measurement. However, the object 100 for shape measurement is not limited to the workpiece, and may be other members such as a tool and a jig.

Such a machine tool 80 includes a numerical controller 82. The numerical controller 82 is an apparatus that analyzes a machining program (also referred to as an "NC program") and makes an instruction for a tool path for a workpiece, work processes required for machining, and the like with numerical value information including information such as numerical values and codes in order to operate the machine tool 80. Based on the CAD data 44 indicating the shape of the workpiece (that is, the object 100), this numerical controller 82 checks interference between the tool and the workpiece, generates a tool path, determines machining accuracy, determines whether the shape of the object 100 matches a reference shape, and determines whether the object 100 is at a predetermined position. Such a numerical controller 82 is physically a computer including a processor and a memory. In addition, an operation panel 84 for presenting information to the operator and receiving an instruction from the operator is provided in the machine tool 80. The numerical controller 82 can communicate with a controller 12 of the three-dimensional point cloud data processing system 10 through wired or wireless communication.

The three-dimensional point cloud data processing system 10 generates the CAD data 44 and point cloud data 40 indicating the shape of the object 100, and includes the controller 12 and an imaging unit 22. The imaging unit 22 images the object 100. Image data 30 obtained by imaging by the imaging unit 22 is transmitted to the controller 12. The image data 30 is information in which a brightness value is recorded for each of a plurality of pixels, that is, brightness information 32.

The controller 12 controls imaging processing by the imaging unit 22, and generates the point cloud data 40 (not shown in FIG. 1) and the CAD data 44 based on the obtained image data 30. The generated CAD data 44 are transmitted to the numerical controller 82.

Figure 2:
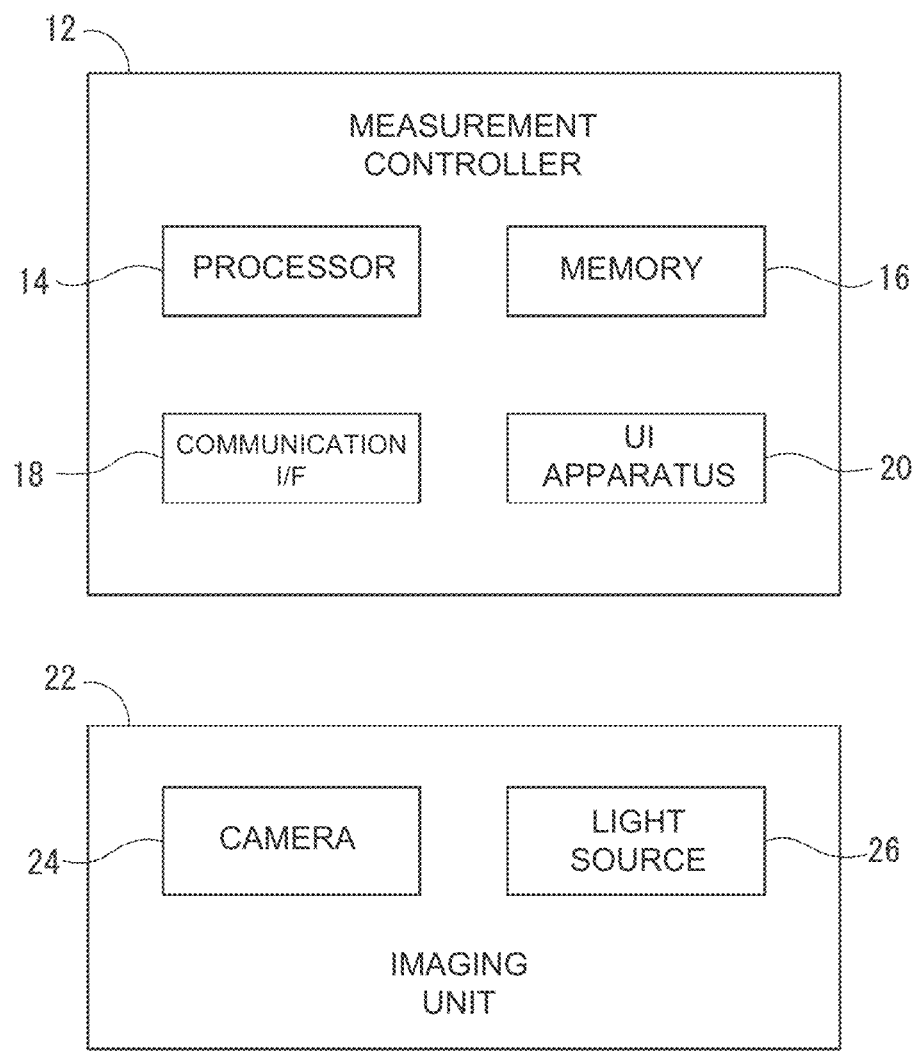
FIG. 2 is a block diagram showing the configuration of the three-dimensional point cloud data processing system.

Next, the configuration of the three-dimensional point cloud data processing system 10 will be described in more detail. FIG. 2 is a block diagram showing the configuration of the three-dimensional point cloud data processing system 10. As shown in FIG. 2 and as described above, the three-dimensional point cloud data processing system 10 includes the controller 12 and the imaging unit 22.

The controller 12 is physically a computer including a processor 14, a memory 16, a communication I/F 18, and a UI apparatus 20. The "computer" also includes a microcontroller in which a computer system is integrated into a single integrated circuit. In addition, the processor 14 refers to a processor in a broad sense, and includes a general-purpose processor (for example, a central processing unit (CPU)) and a dedicated processor (for example, a graphics processing unit (GPU), an application specific integrated circuit (ASIC), a field programmable gate array (FPGA), and a programmable logic device).

The memory 16 stores various kinds of data, and includes both a main storage device accessed directly by the processor 14 and an auxiliary storage device accessed through an input/output channel. The main storage device is, for example, a semiconductor memory. The auxiliary storage device is, for example, a semiconductor memory or a magnetic storage device.

The communication I/F 18 transmits and receives data to and from other external electronic equipment through wired communication or wireless communication. The communication I/F 18 communicates with, for example, the numerical controller 82 and the imaging unit 22. The UI apparatus 20 presents various kinds of information to the operator and receives instructions from the operator. The UI apparatus 20 includes, for example, an output device such as a display and a speaker and an input device such as a keyboard, a mouse, a microphone, and a touch panel. In addition, although the UI apparatus 20 is described as a component of the controller 12 in this example, a part or the entirety of the UI apparatus 20 may be configured as another apparatus completely different from the controller 12. For example, some of the functions of the UI apparatus 20 may be realized by a user interface of an information terminal (for example, a smart phone) owned by the operator and capable of communicating with the controller 12. In addition, the controller 12 does not need to be a single computer, and may be configured by combining a plurality of physically separated computers.

The imaging unit 22 images the object 100 present in the machining chamber of the machine tool 80. As shown in FIG. 2, the imaging unit 22 includes a camera 24 and a light source 26. The camera 24 images the object 100 to generate image data 30. The image data 30 obtained by the camera 24 is transmitted to the controller 12. In addition, the number of cameras 24 may be one or more.

The light source 26 illuminates the object 100. The light source 26 may be a light that simply illuminates the object 100, or may be a projector that emits predetermined pattern light to the object 100.

Figure 3:
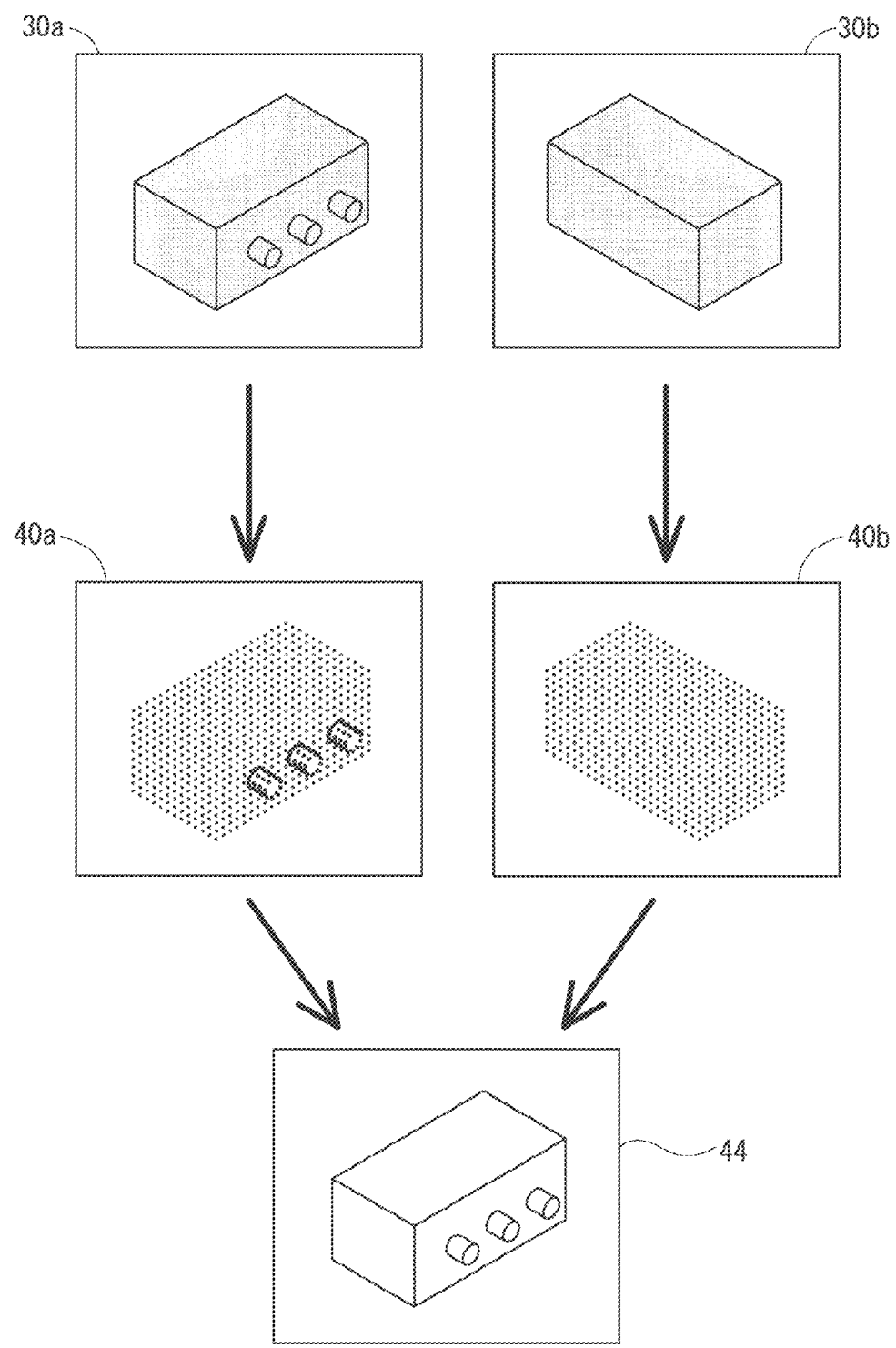
FIG. 3 is a diagram describing the general flow of creating a three-dimensional model.

Next, the principle of generation of the point cloud data 40 of the object 100 by the three-dimensional point cloud data processing system 10 will be described with reference to FIG. 3. When generating the point cloud data 40 of the object 100, the controller 12 drives the imaging unit 22 to acquire the image data 30 of the object 100. At this time, the relative posture of the object 100 with respect to the camera 24 is changed so that the image data 30 can be obtained for all surfaces of the object 100, thereby performing imaging multiple times. In addition, in order to change the relative posture of the object 100 with respect to the camera 24, the object 100 may be moved, or the camera 24 may be moved. In this example, the spindle 81 that holds the object 100 is driven to change the posture of the object 100 with respect to the camera 24.

The controller 12 generates the point cloud data 40 of the object 100 based on the obtained image data 30 (that is, the brightness information 32). In the example of FIG. 3, point cloud data 40a and 40b of the object 100 is generated from image data 30a obtained by imaging the object 100 from a first direction and image data 30b obtained by imaging the object 100 from a second direction that is different from the first direction, and the CAD data 44 of the object 100 is generated based on the point cloud data 40a and 40b.

When generating the point cloud data 40, the presence or absence of points (hereinafter, referred to as "effective points") forming the outer surface of the object 100 and their coordinates when there are effective points are specified for each of the pixels forming the image data 30. Here, the specified coordinates are coordinates in a camera coordinate system with the optical axis of the camera 24 as a reference. By calculating such effective points, the point cloud data 40 in the camera coordinate system can be obtained.

When the point cloud data 40a and 40b in the camera coordinate system are obtained for each of the plurality of items of image data 30a and 30b, the CAD data 44 indicating the shape of the object 100 is generated based on the point cloud data 40a and 40b. When generating the CAD data 44, synthetization of the items of data calculated from the image data 30a and 30b, conversion from point cloud data to mesh data, and conversion from mesh data to solid data are performed. Among these, data synthetization may be performed before conversion to mesh data, or may be performed after conversion to mesh data. That is, a plurality of items of point cloud data 40a and 40b may be transformed into the world coordinate system and synthesized, and one item of mesh data may be calculated from the point cloud data 40 after the synthetization. Alternatively, as another form, each of the plurality of items of point cloud data 40a and 40b may be converted into mesh data, and then the plurality of items of mesh data may be transformed into the world coordinate system and synthesized.

The point cloud data 40 is calculated by using a light section method, a phase shift method, a trigonometric method, a stereo method, or a combination thereof. In addition, when using the light section method or the phase shift method, the light source 26 emits pattern light suitable for these methods to the object 100. In addition, when using the trigonometric method, the imaging unit 22 simultaneously images one object 100 with two or more cameras 24 arranged so as to be spaced apart from each other.

Figure 4:
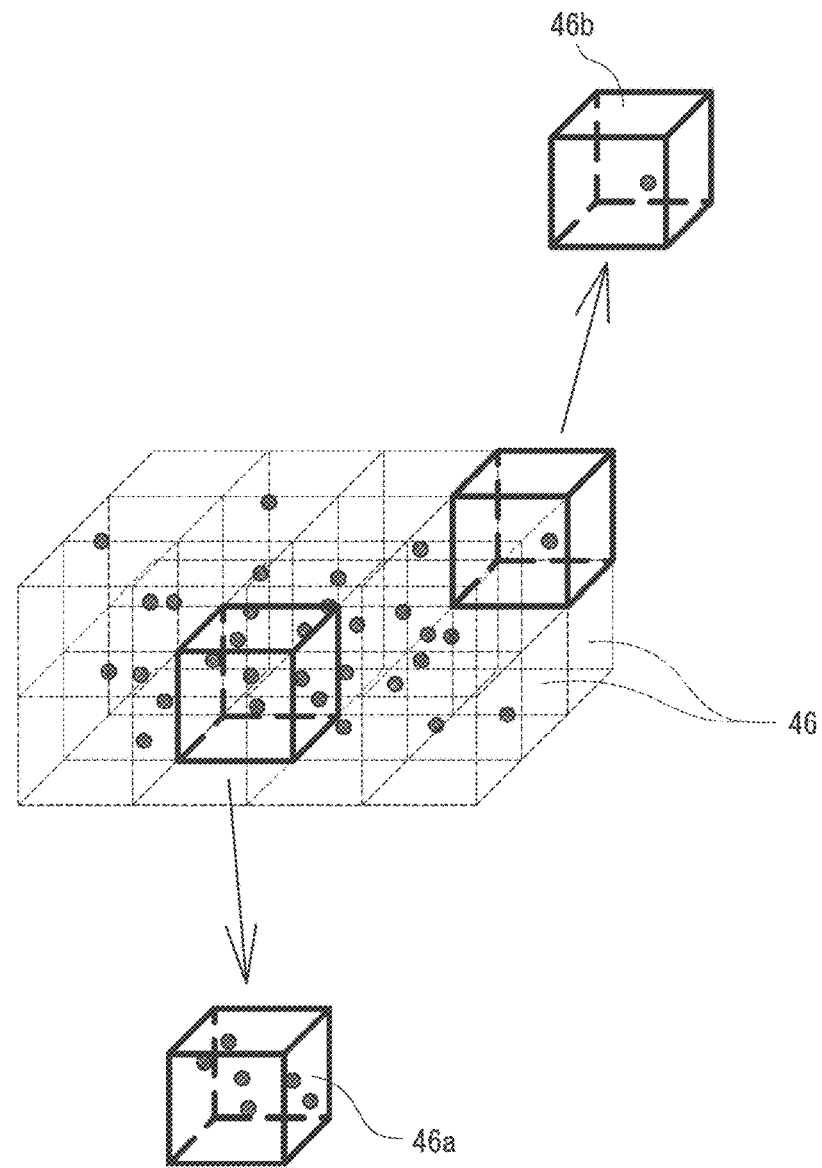
FIG. 4 is a schematic diagram describing high-accuracy noise removal.

Incidentally, the point cloud data 40 simply extracted from the image data 30 includes many points unrelated to the object 100, that is, so-called noise. In order to remove such noise, many noise removal techniques have been proposed. FIG. 4 is an image diagram showing an example of a high-accuracy noise removal technique. In this high-accuracy noise removal technique, the space in which the point cloud data 40 is arranged is divided into a plurality of grid spaces 46 arranged in a 3D matrix, and the density of points is calculated for each grid space 46. Then, for the grid space 46 whose density is equal to or less than a predetermined value, points inside the grid space 46 are regarded as noise and deleted. In the example of FIG. 4, since a grid space 46a has a high point density, the points in the grid space 46a are determined as effective points. On the other hand, since a grid space 46b has a low point density, the points in the grid space 46b are removed as noise.

According to such a high-accuracy noise removal technique, noise can be removed with high accuracy. However, there is a problem that the amount of calculation increases and it takes time to acquire the final point cloud data 40. Therefore, in this example, before applying the high-accuracy noise removal technique, rough noise removal is performed in advance by using a bounding box 50 (hereinafter, referred to as a "BB 50") described later. Hereinafter, the noise removal technique using this BB 50 will be referred to as "BB type noise removal".

Figure 5:
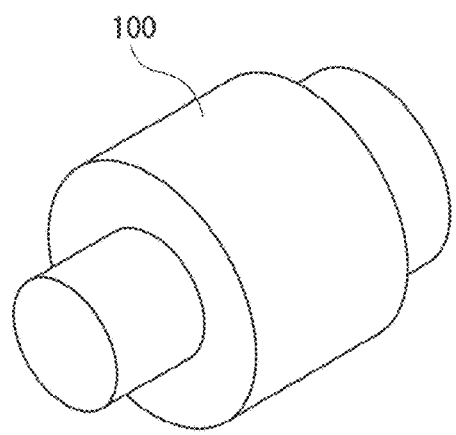
FIG. 5 is a diagram showing an example of an object.
Figure 6:
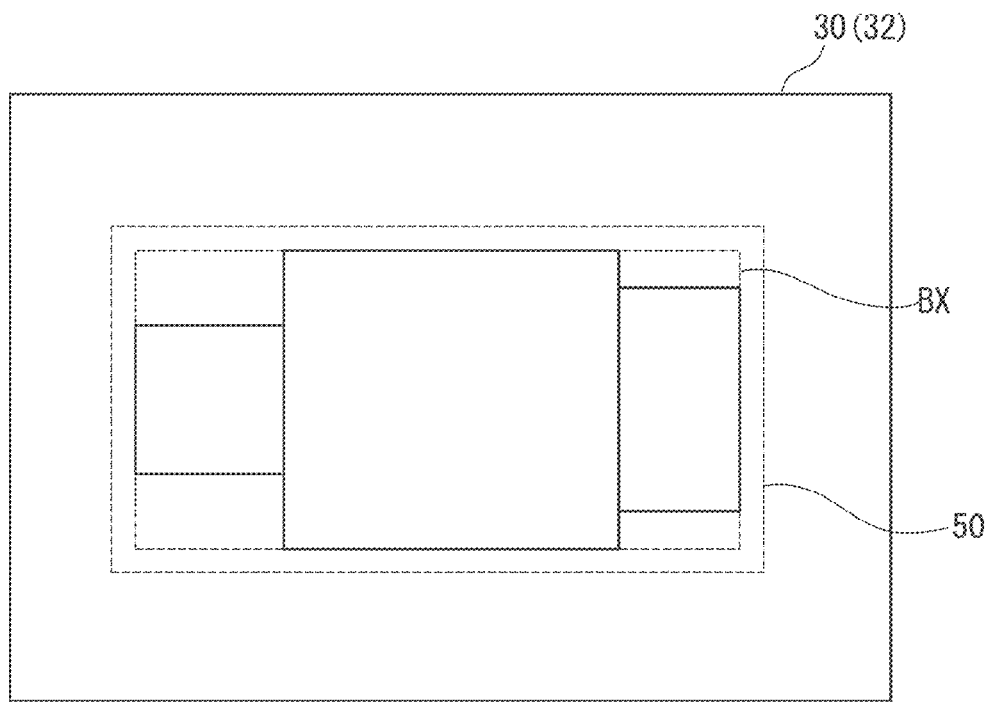
FIG. 6 is a diagram showing an example of a BB.

First, the BB 50 used in the BB type noise removal will be described. FIG. 5 is a perspective view of the object 100, and FIG. 6 is a schematic diagram of the image data 30 obtained by imaging the object 100. The BB 50 is a figure surrounding the object 100, and is formed by combining one or more rectangles. In the example of FIG. 6, a figure obtained by offsetting a rectangle BX, which is formed by a line along the rightmost edge of the object 100, a line along the uppermost edge of the object 100, a line along the leftmost edge of the object 100, and a line along the lowermost edge of the object 100, outward by a predetermined amount is extracted as the BB 50.

Figure 7:
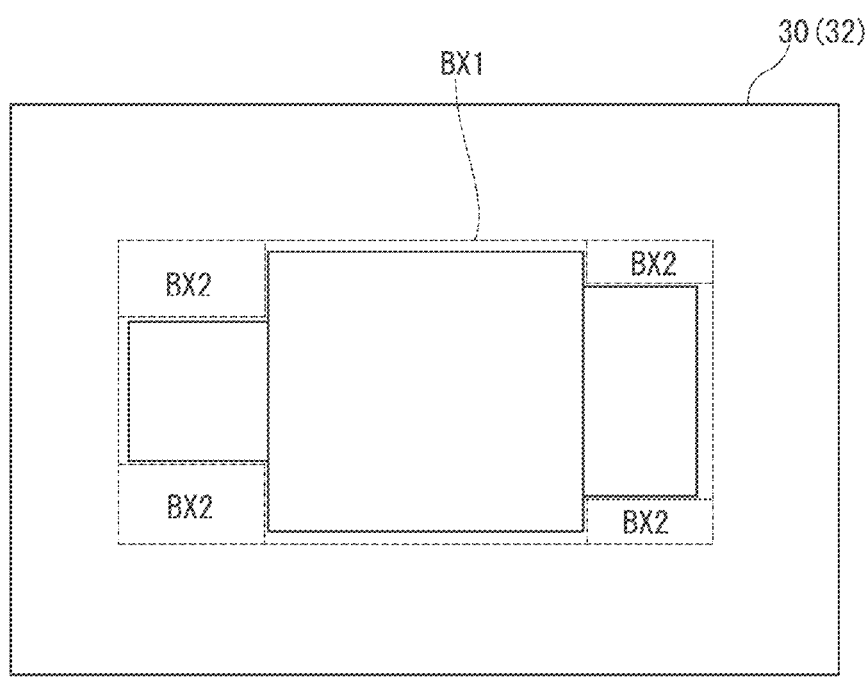
FIG. 7 is a diagram showing how another BB is calculated.
Figure 8:
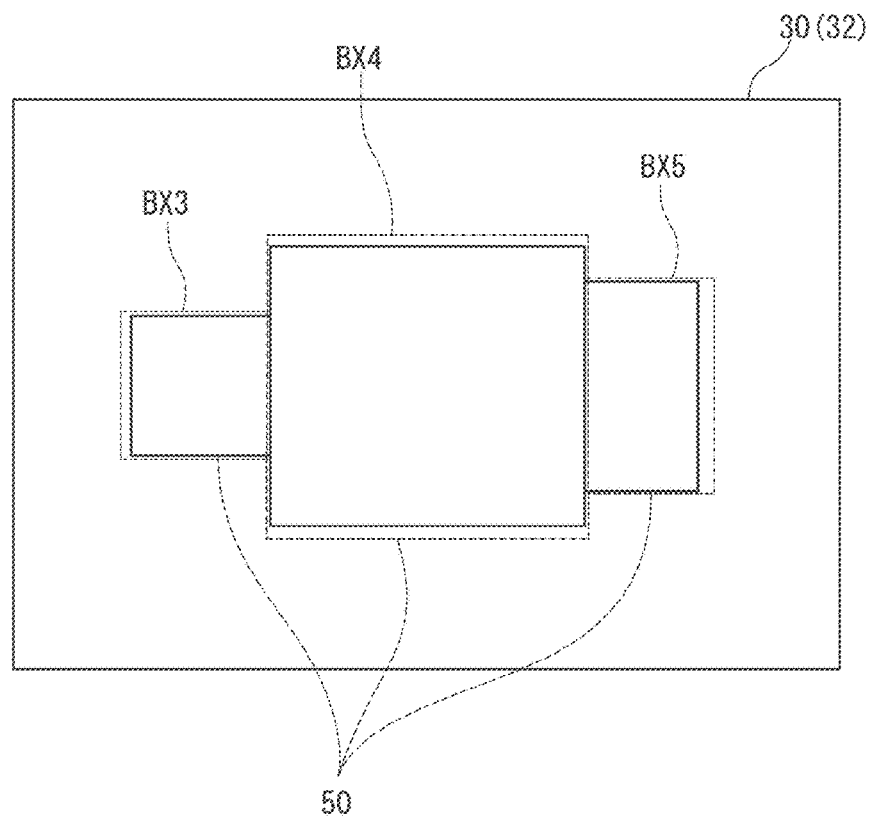
FIG. 8 is a diagram showing another example of the BB.

In addition, the BB 50 may be formed by combining two or more rectangles. For example, as shown in FIG. 7, a first rectangle BX1 surrounding the entire object 100 is extracted, and then a corner region BX2 where the object 100 is not present (that is, there is no brightness) inside the first rectangle BX1 is calculated. Thereafter, as shown in FIG. 8, the first rectangle BX1 may be divided into a plurality of rectangles BX3, BX4, and BX5 based on the region BX2. Then, the three rectangles BX3, BX4, and BX5 may be acquired as the final BB 50.

In addition, when calculating the BB 50, one or more image processes may be performed on the image data 30 so that the range in which the object 100 is present can be clearly specified. For example, the image data 30 may be subjected to edge enhancement, solarization, binarization processing, morphology processing, blob processing, and a combination thereof. For example, when the image data 30 is subjected to edge enhancement and solarization and then subjected to binarization processing and morphology processing, the object shown in the image data 30 becomes a continuous black mass. The controller 12 extracts a circumscribing rectangle surrounding the continuous black mass as the BB 50. When a plurality of black masses are present in one image data 30, a circumscribing rectangle is calculated for each of the plurality of masses, and the largest rectangle among the plurality of rectangles is extracted as the BB 50. In addition, when the background of the object 100 becomes an obstacle in the process of calculating the BB 50, the background image data may be stored in advance, and the BB 50 may be calculated after removing the background from the image data 30 by using a subtraction method.

Since the BB 50 is a frame indicating the range in which the object 100 is present, points located outside the BB 50 can be removed as noise unrelated to the object 100. Therefore, in this example, the BB 50 of the object 100 is specified from the image data 30, and points calculated from the information on the pixels outside the BB 50 or the brightness information 32 are removed as noise.

The noise removal processing is roughly divided into two-dimensional noise removal processing that is completed with only one item of image data 30 and three-dimensional noise removal processing that is performed by using two or more items of image data 30 obtained by imaging from different directions.

Figure 9:
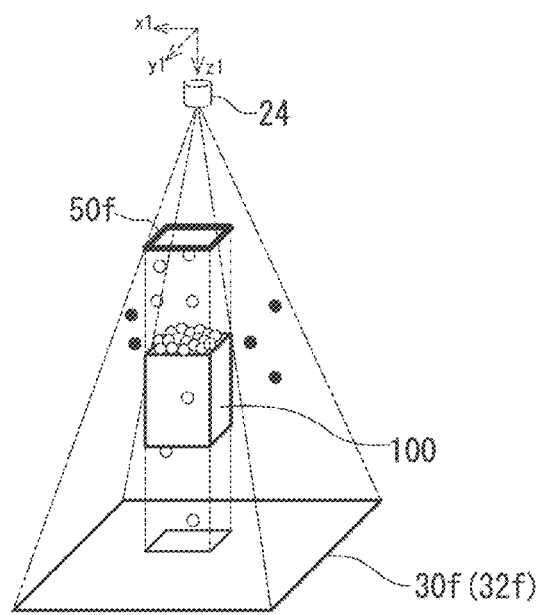
FIG. 9 is a schematic diagram describing two-dimensional noise removal using a BB.

First, two-dimensional noise removal processing will be described with reference to FIG. 9. In this case, the controller 12 calculates, from one item of image data 30 (hereinafter, referred to as "first image data 30$f$" or "first brightness information 32$f$"), a first BB 50$f$ surrounding the object 100 shown in the first image data 30$f$. Thereafter, the controller 12 removes, as noise, points calculated from the first brightness information 32$f$ or pixel values (that is, brightness values of the pixels) located outside the first BB 50$f$. The controller 12 performs this processing on all the items of image data 30 obtained by imaging. The two-dimensional noise removal processing may be performed before calculating the point cloud data 40, or may be performed after calculating the point cloud data 40. In addition, in this case, the point cloud data 40 may be expressed in the camera coordinate system, or may be transformed into the world coordinate system. In the example of FIG. 9, since the black points or pixel values are located outside the first BB 50$f$ when viewed from the first imaging direction (that is, z1 direction), the black points or pixel values are regarded as noise.

Here, the first BB 50$f$ has a simple shape formed by straight lines parallel to the camera coordinate system. Such a simple-shaped first BB 50$f$ can be calculated very easily compared with the outer shape of the object 100 itself. In addition, the amount of calculation for determining whether a point or pixel is inside the first BB 50$f$ can be greatly reduced compared with the amount of calculation for determining whether a point or pixel is inside the outer shape of the object 100. As a result, the amount of calculation when removing noise using the first BB 50$f$ can be greatly reduced compared with the amount of calculation when removing noise using the outer shape of the object 100 itself.

Figure 10:
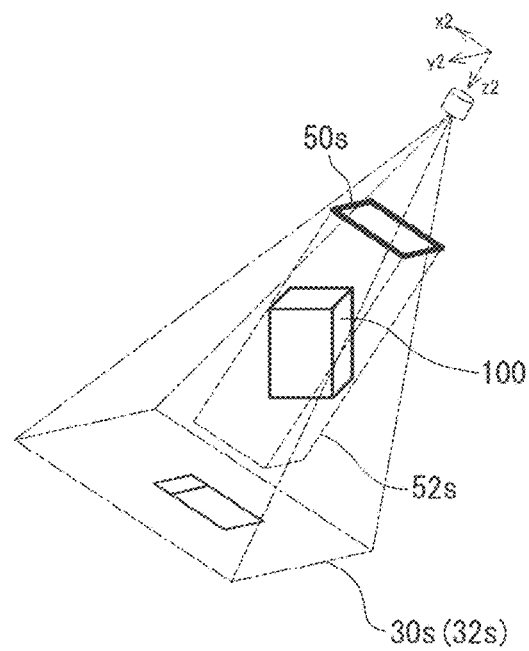
FIG. 10 is a schematic diagram describing a BB push-out space.

However, since the first BB 50$f$ itself has only two-dimensional information, the first BB 50$f$ alone cannot remove three-dimensional noise. Therefore, in this example, three-dimensional noise removal processing is performed by further using second brightness information 32$s$ whose imaging direction is different from that of the first brightness information 32$f$. This will be described with reference to FIG. 10 and FIG. 11. The controller 12 calculates the point cloud data 40 from one item of image data 30 (hereinafter, referred to as "first image data 30$f$" or "first brightness information 32$f$"). The point cloud data 40 referred to herein may be point cloud data expressed in the camera coordinate system, or may be point cloud data expressed in the world coordinate system. In addition, the controller 12 calculates a second BB 50$s$ surrounding the object 100 and a second BB push-out space 52$s$ from another image (hereinafter, referred to as "second image data 30$s$" or "second brightness information 32$s$") obtained by imaging the object 100 from a direction different from the first image data 30$f$. FIG. 10 is a schematic diagram showing the second BB 50$s$ and the second BB push-out space 52$s$.

Hereinafter, the camera coordinate system in the first brightness information 32$f$ is referred to as a first camera coordinate system (x1, y1, z1), and the camera coordinate system in the second brightness information 32$s$ is referred to as a second camera coordinate system (x2, y2, z2). As shown in FIG. 9, the first BB 50$f$ is a two-dimensional figure parallel to the x1-y1 plane of the first camera coordinate system. In addition, as shown in FIG. 10, the second BB 50$s$ is a two-dimensional figure parallel to the x2-y2 plane of the second camera coordinate system. In addition, the second BB push-out space 52$s$ has a three-dimensional shape that is long in the z2 direction.

When the second BB push-out space 52$s$ can be calculated, the controller 12 superimposes the second BB push-out space 52$s$ on the point cloud data 40 calculated from the first brightness information 32$f$. When the point cloud data 40 is expressed in the first camera coordinate system, the second BB push-out space 52$s$ is coordinate-transformed into the first camera coordinate system and then superimposed on the point cloud data 40. When the point cloud data 40 is transformed into the world coordinate system, the second BB push-out space 52$s$ is coordinate-transformed into the world coordinate system and then superimposed on the point cloud data 40.

Figure 13:
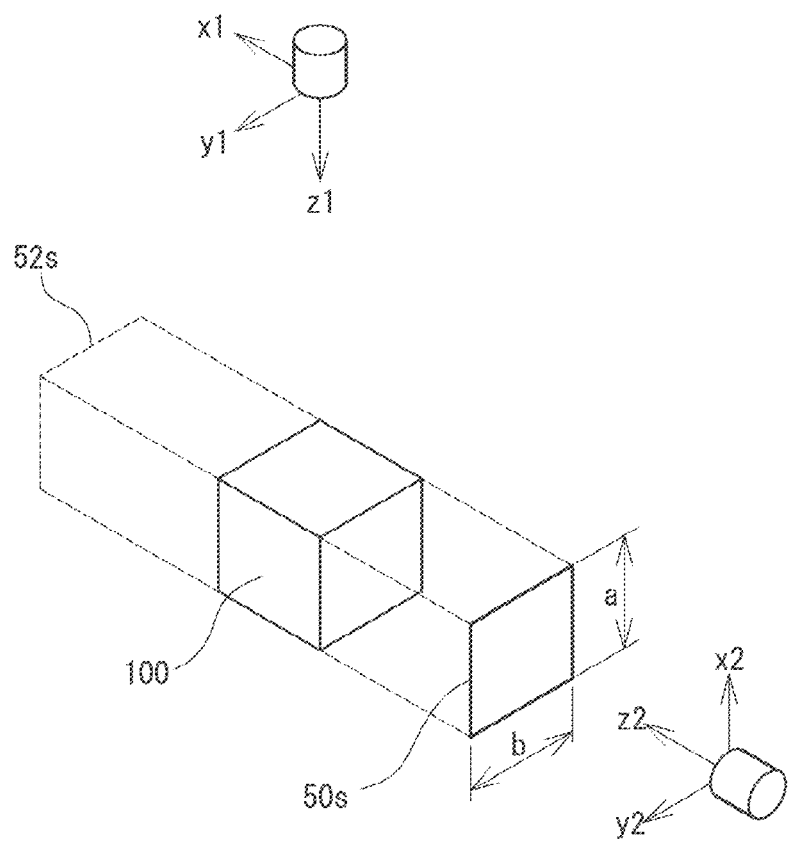
FIG. 13 is a diagram describing coordinate transformation of the BB push-out space.

FIG. 13 shows how the second BB push-out space 52$s$ is coordinate-transformed into the first camera coordinate system. In FIG. 13, the second camera coordinate system is rotated by 90° with respect to the first camera coordinate system for ease of explanation. As shown in FIG. 13, it is assumed that the second BB push-out space 52$s$ has a shape with a in the x2 direction, b in the y2 direction, and an infinite size in the z2 direction in the second camera coordinate system. When the second BB push-out space 52$s$ is coordinate-transformed into the first camera coordinate system, the second BB push-out space 52$s$ has a shape with a in the z1 direction, b in the y1 direction, and an infinite size in the x1 direction.

Figure 11:
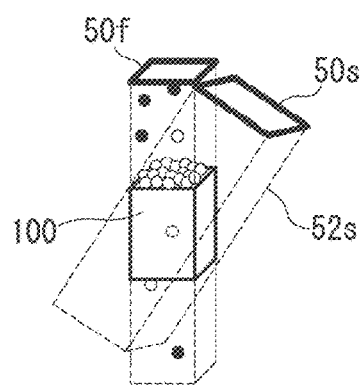
FIG. 11 is a schematic diagram describing three-dimensional noise removal.

FIG. 11 shows a state in which the second BB push-out space 52$s$ is superimposed on the point cloud data 40 calculated from the first brightness information 32$f$. In addition, in FIG. 11, two-dimensional noise removal processing using the first BB 50$f$ is performed in advance on the point cloud data 40 calculated from the first brightness information 32$f$. The controller 12 regards points located outside the second BB push-out space 52s, among the items of point cloud data 40 calculated from the first brightness information 32f, as noise, and deletes these points. In the example of FIG. 11, black points in the point cloud are removed as noise.

As described above, by superimposing the second BB push-out space 52s calculated from the second brightness information 32s on the point cloud data 40 calculated from the first brightness information 32f, noise included in the point cloud can be removed three-dimensionally. On the other hand, the second BB push-out space 52s has a simple shape in which the second BB 50s is pushed out in one direction. Therefore, both a calculation for calculating the second BB push-out space 52s and a calculation for determining whether a point is located outside the second BB push-out space 52s can be performed with a relatively small amount of calculation. As a result, according to this example, noise can be removed three-dimensionally in a short period of time.

Figure 12:
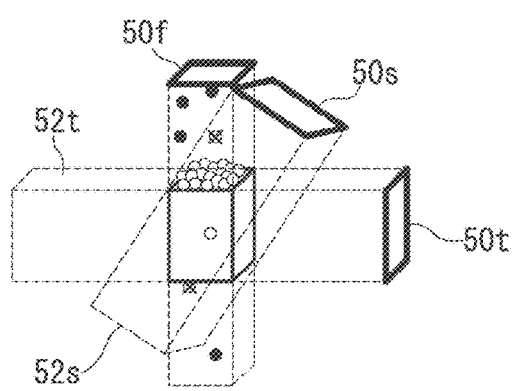
FIG. 12 is a schematic diagram describing three-dimensional noise removal.

Here, only the second BB push-out space 52s is superimposed on the point cloud data 40 calculated from the first brightness information 32f. However, an additional BB push-out space may be calculated based on additional brightness information obtained by imaging from another direction, and the additional BB push-out space may be superimposed on the point cloud data 40 calculated from the first brightness information 32f in addition to the second BB push-out space 52s. For example, as shown in FIG. 12, a third BB push-out space 52t may be calculated from third brightness information obtained by imaging from a third imaging direction, and the third BB push-out space 52t may be superimposed on the point cloud data 40 calculated from the first brightness information 32f. Then, in the point cloud, points located outside the third BB push-out space 52t may be removed as noise. In the example of FIG. 12, by additionally superimposing the third BB push-out space 52t, crossed points are newly removed as noise.

In addition, the number of items of such additional brightness information is not particularly limited. Theoretically, however, noise can be efficiently removed three-dimensionally with a small amount of data by making the imaging direction of the first brightness information 32f that is a noise removal target, the imaging direction of the second brightness information 32s, and the imaging direction of one item of additional brightness information, perpendicular to each other.

Next, processing for generating the CAD data 44 of the object 100 by using the BB type noise removal will be described with reference to FIG. 14 and FIG. 15. When generating the CAD data 44, first, the three-dimensional point cloud data processing system 10 is initialized (S10). In this initialization, for example, setting of the operation parameters of the camera 24 or the light source 26 and coordinate alignment between the camera coordinate system and the world coordinate system are performed. Subsequently, the operator sets the object 100 so that it can be imaged by the camera 24 (S12). In this example, the object 100 is attached to the spindle 81 of the machine tool 80.

In this state, the controller 12 adjusts the posture of the object 100 (S14). Specifically, the controller 12 instructs the machine tool 80 to bring the object 100 into a predetermined posture. In response to this instruction, the machine tool 80 adjusts the posture of the object 100 by rotating the spindle 81 so that the camera 24 can image the object 100 from any direction.

When the posture of the object 100 can be adjusted, the object 100 is imaged by the camera 24 (S16). The image data 30 obtained by the imaging is transmitted from the camera 24 to the controller 12, and is stored in the memory 16 as the brightness information 32 so as to be associated with information regarding the imaging position or the imaging direction. The controller 12 generates the point cloud data 40 from the obtained brightness information 32 (S18). Specifically, by using, for example, a light section method, a phase shift method, a trigonometric method, or a combination thereof, the controller 12 determines the presence or absence of an effective point for each pixel and the z-direction position of the effective point in the camera coordinate system when there is an effective point. A group of points obtained as described above is the point cloud data 40. In addition, when using the light section method or the phase shift method, the light source 26 emits pattern light suitable for these methods to the object 100.

Subsequently, the controller 12 checks whether all necessary surfaces of the object 100 have been imaged (S20). In many cases, the number of surfaces to be imaged is two to four surfaces of the top surface, bottom surface, right side surface, and left side surface of the object 100. However, in order to increase the accuracy, a larger number of surfaces may be imaged. In addition, the surfaces to be imaged do not need to be perpendicular to each other, and may be surfaces having any angle therebetween.

When there is a surface that cannot be imaged, the process returns to step S14 to change the posture of the object 100 and then image the object 100 and generate the point cloud data 40 (S16 and S18). On the other hand, when imaging of all surfaces is completed, the controller 12 removes noise from the obtained point cloud data 40 (S22 to S28).

Specifically, first, the controller 12 calculates the BB 50 for each of the items of obtained image data 30 (S22). Subsequently, background noise removal processing is performed on the point cloud data 40 obtained for each of the items of image data 30 (S24). In the background noise removal processing, background image data captured without the object 100 is acquired in advance, and the area that is a background in the image data 30 is specified as a background area based on the comparison between the background image data and the actual image data 30. Thereafter, points in the background area are collectively deleted from the point cloud data 40 calculated from the image data. In step S24, the background noise removal processing is performed on all of the plurality of items of image data 30 obtained. In addition, the background noise removal processing may be omitted.

Then, the controller 12 removes noise included in the point cloud data 40 by applying BB type noise removal (S26). Specifically, the controller 12 removes, as noise, points located outside the first BB 50f when viewed from the first imaging direction among the items of point cloud data 40f obtained from the first brightness information 32f. In addition, the point cloud data 40f is point cloud data after performing the background noise removal processing described above.

In addition, the controller 12 pushes out the second BB 50s calculated from the second brightness information 32s in the second imaging direction to calculate the second BB push-out space 52s. Thereafter, the controller 12 transforms the coordinates of the second BB push-out space 52s and then superimposes the second BB push-out space 52s on the point cloud data 40f. Then, the controller 12 removes, as noise, points located outside the second BB push-out space 52s among the items of point cloud data 40. In addition, similar processing is performed by using additional BB push-out space.

The controller 12 sequentially changes the allocation of the first brightness information 32f, the second brightness information 32s, and the additional brightness information to perform two-dimensional noise removal processing and three-dimensional noise removal processing using the BB 50 for all of the items of brightness information 32. For example, in the first noise removal processing, noise removal is performed with the brightness information obtained by the first imaging as the "first brightness information 32f", the brightness information obtained by the second imaging as the "second brightness information 32s", and the brightness information obtained by the third imaging as the "additional brightness information". In the second noise removal processing, noise removal is performed with the brightness information obtained by the second imaging as the "first brightness information 32f", the brightness information obtained by the third imaging as the "second brightness information 32s", and the brightness information obtained by the first imaging as the "additional brightness information".

When the BB type noise removal is completed, the noise included in the point cloud data 40 is greatly reduced, and the number of points forming the point cloud data 40 and the data size are also greatly reduced. In this state, the controller 12 applies high-accuracy noise removal to the point cloud data 40 (S28). In the high-accuracy noise removal, as described above and as shown in FIG. 4, a plurality of grid spaces 46 are superimposed on the point cloud data 40, and noise is removed from the density of points in each grid space 46. The high-accuracy noise removal tends to require a large amount of calculation and a long calculation time. In this example, however, since background noise removal and BB type noise removal are performed in advance to remove most of the noise, the amount of data is reduced. As a result, the processing time for the high-accuracy noise removal can be shortened significantly.

After the high-accuracy noise removal is completed, the controller 12 decimates the points forming the point cloud data 40 to the extent necessary for generating the CAD data 44 (S30). Then, the controller 12 generates mesh data from the plurality of items of point cloud data 40 obtained for each item of brightness information 32, and converts the mesh data into a solid model, that is, the CAD data 44 (S30 to S42). Mesh data may be generated after synthesizing a plurality of items of point cloud data 40 obtained for each item of brightness information 32 (S34 and S36). Alternatively, as another form, each of the plurality of items of point cloud data 40 may be converted into mesh data, and the plurality of items of mesh data obtained may be synthesized (S38 and S40). In any case, one item of mesh data indicating the three-dimensional shape of the object 100 and the CAD data 44 are finally obtained (S42). The point cloud data 40 may be voxelized instead of being meshed, and the voxelized data may be converted into the CAD data 44. The generated CAD data 44 is transmitted to the machine tool 80 through the communication I/F 18.

When synthesizing the point cloud data 40 or mesh data, each item of point cloud data 40 or mesh data needs to be transformed into the world coordinate system. For this coordinate transformation, it is necessary to accurately acquire the imaging direction of the object 100. The imaging direction may be determined from machine tool position information such as the rotation angle of the spindle 81 transmitted from the machine tool 80 (that is, an apparatus for holding the object 100), or may be determined from a plane equation. In the plane equation, a reference mark is set on the object 100 or on a reference object whose position and posture are invariant with respect to the object 100. Then, the posture of the object 100 is determined from the position and shape of the reference mark in the captured image of the object 100.

Next, another example of processing for generating the CAD data 44 will be described. In FIG. 14 and FIG. 15, the BB type noise removal is applied after generating all the items of point cloud data 40. However, the BB type noise removal may be applied during the process of generating the point cloud data 40.

Figure 14:
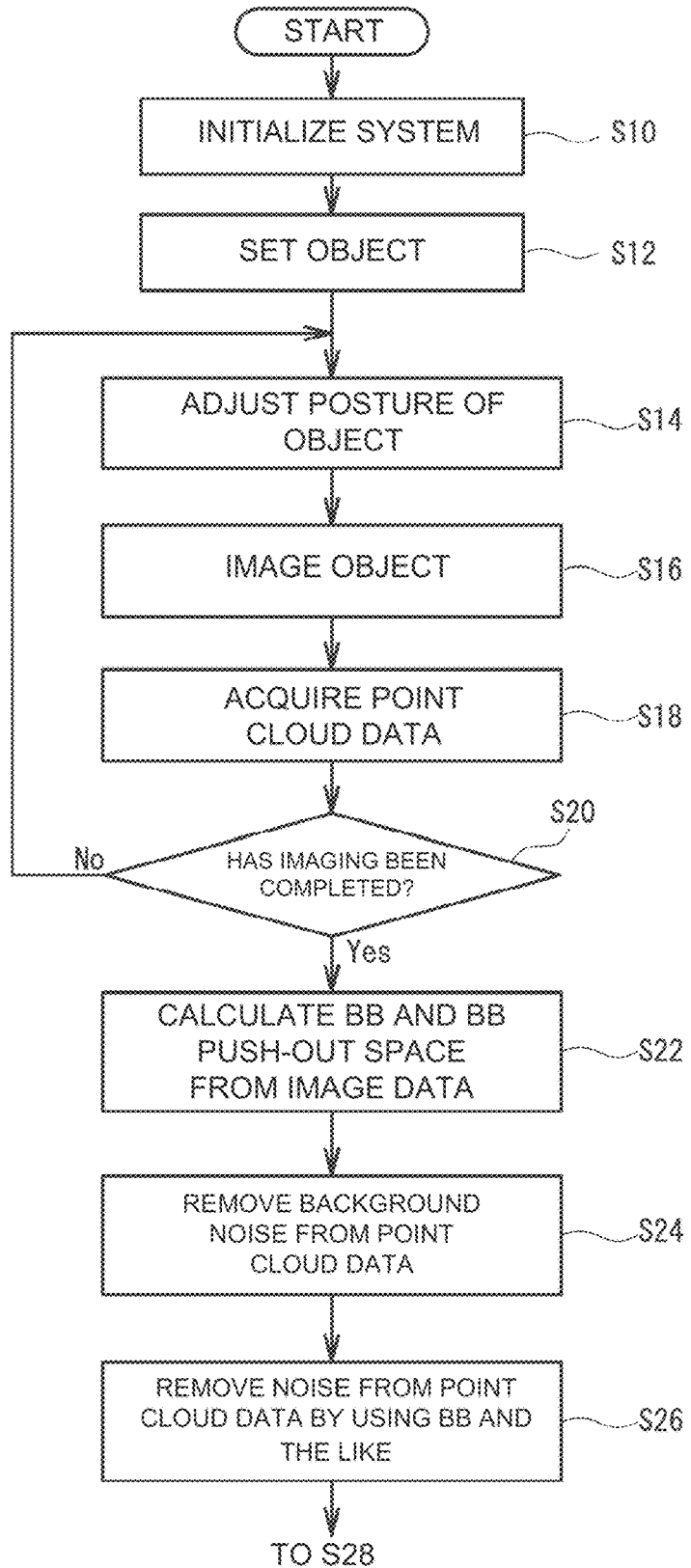
FIG. 14 is a flowchart showing the flow of the first half of a CAD data generation process.
Figure 15:
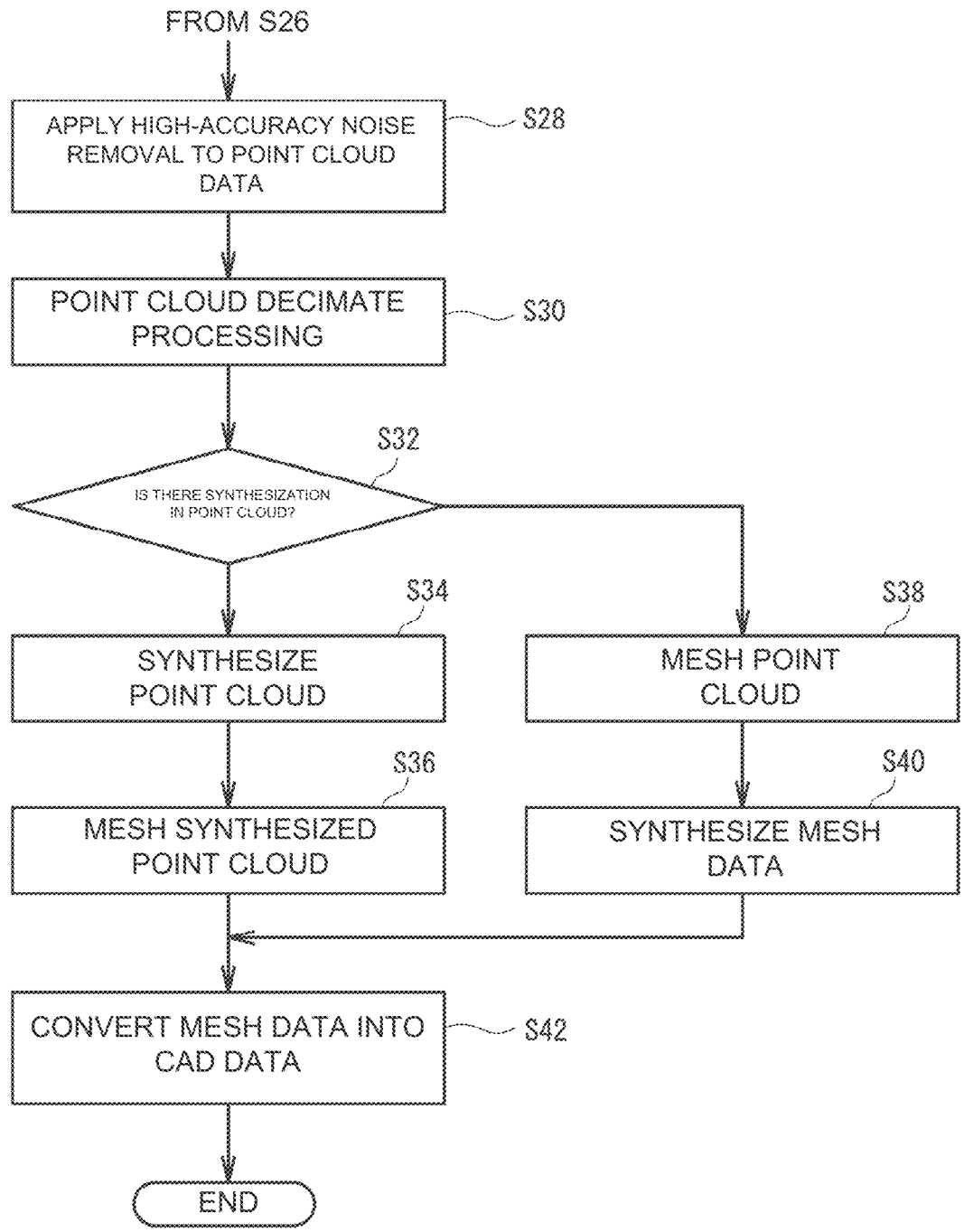
FIG. 15 is a flowchart showing the flow of the second half of the CAD data generation process.
Figure 16:
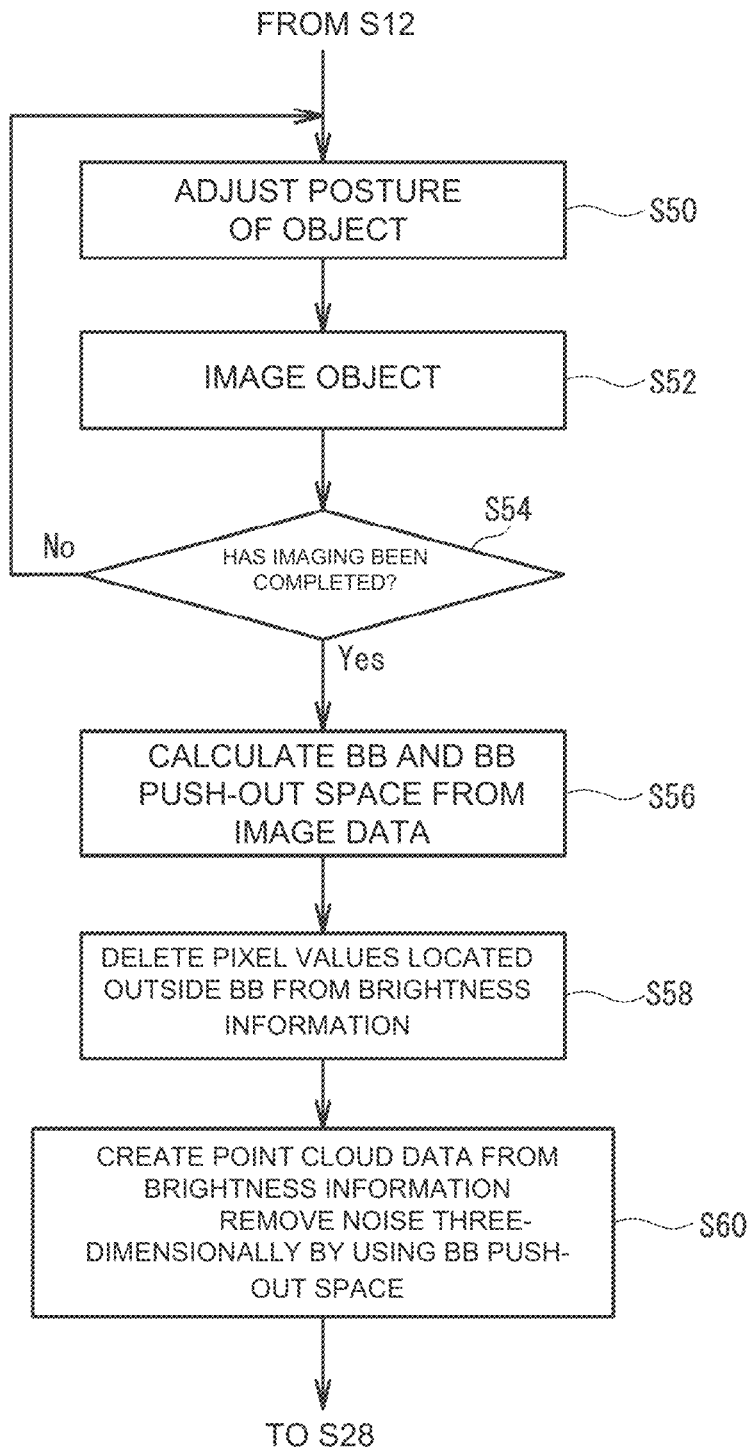
FIG. 16 is a flowchart showing another example of the flow of the first half of the CAD data generation process.

For example, instead of steps S14 to S26 in FIG. 14, steps S50 to S60 in FIG. 16 may be executed. In this case, the controller 12 images the object 100 while changing the posture of the object 100 (S50 to S54). When imaging of all the necessary surfaces is completed, the controller 12 calculates the BB 50 and the BB push-out space 52 for each of the plurality of items of brightness information 32 (S56).

Subsequently, the controller 12 superimposes the first BB 50f on the first brightness information 32f, and deletes pixel values located outside the first BB 50f (S58). That is, unnecessary information is deleted before generating the point cloud data 40f from the first brightness information 32f. As a result, the amount of calculation required for the next processing for generating the point cloud data 40f can be greatly reduced. The controller 12 performs such two-dimensional noise removal processing on all the items of brightness information 32 by changing the allocation of the first brightness information 32f. That is, in the first two-dimensional noise removal processing, the brightness information obtained in the first imaging is set as the "first brightness information 32f", and in the second two-dimensional noise removal processing, the brightness information obtained in the second imaging is set as the "first brightness information 32f".

When the two-dimensional noise removal processing is completed for all the items of brightness information 32, the controller 12 generates the point cloud data 40 and performs three-dimensional noise removal processing (S60). That is, based on the brightness information 32, the controller 12 determines the presence or absence of an effective point for each pixel and the z-direction position of the effective point in the camera coordinate system. At this time, the controller 12 further determines whether each effective point is located outside the BB push-out space 52 (that is, the second BB push-out space 52s or the additional BB push-out space) calculated from the brightness information 32 (that is, the second brightness information 32s or the additional brightness information) with an imaging angle different from that of the target brightness information 32 (that is, the first brightness information 32f). When the effective point is located outside the BB push-out space 52 with a different imaging angle, the controller 12 determines that the effective point is noise and removes the effective point. On the other hand, when the effective point is located inside the BB push-out space 52 with a different imaging angle, the controller 12 stores the point as one of the points forming the point cloud data 40. When the three-dimensional noise removal processing is completed, the process proceeds to step S28 in FIG. 15.

As described above, by removing noise two-dimensionally using the BB 50 before generating the point cloud data 40, that is, in the state of the brightness information 32, the calculation time for generating the point cloud data 40 can be greatly reduced. In addition, by removing noise three-dimensionally using the BB push-out space 52 in the process of generating the point cloud data 40, it is possible to reduce the data amount of the point cloud data 40. As a result, it is possible to reduce the amount of calculation and the calculation time required for the high-accuracy noise removal or CAD data generation performed later.

Figure 17:
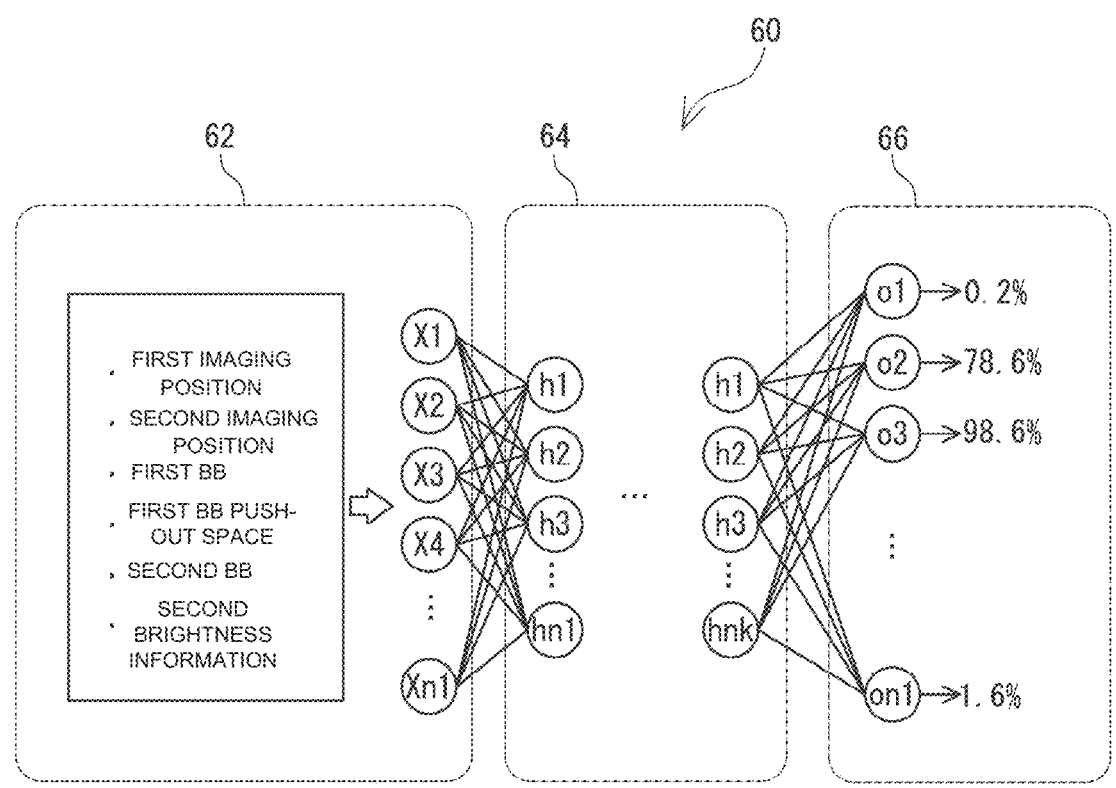
FIG. 17 is a diagram illustrating an example of an AI configuration.

Next, still another example of processing for generating the CAD data 44 will be described. In the example described above, the controller 12 performs noise removal by performing an individual calculation for each point or pixel. However, a pre-trained AI may be constructed, and noise may be removed by using the AI. Specifically, the AI is a supervised learner that is pre-trained to receive the first BB 50f, the second BB 50s, and the first brightness information 32f as its inputs, and output the point cloud data 40 generated from the first brightness information 32f. Such an AI can be constructed as a function of the controller 12. For example, as shown in FIG. 17, the AI 60 may be a three-layer neural network or a four-layer or more deep neural network having one input layer 62, one or more intermediate layers 64, and one output layer 66. In the example of FIG. 17, the first imaging position, the second imaging position, the first brightness information 32f, the first BB 50f, the second BB 50s, and the second BB push-out space 52s are input values. The output value is the presence probability of an effective point in each of a plurality of pixels forming the first brightness information 32f or the presence probability of an effective point in each of a plurality of grid spaces 46 when a three-dimensional space is divided into the plurality of grid spaces 46. When the presence probability of an effective point of each pixel is output, the controller 12 calculates the z-direction position of a point present in each pixel for pixels having a presence probability equal to or greater than a predetermined value, and generates the point cloud data 40. In addition, when the presence probability of an effective point in each grid space 46 is output, the controller 12 generates the point cloud data 40 by assuming that there is a point in the grid space 46 where the presence probability is equal to or greater than a predetermined value.

Figure 18:
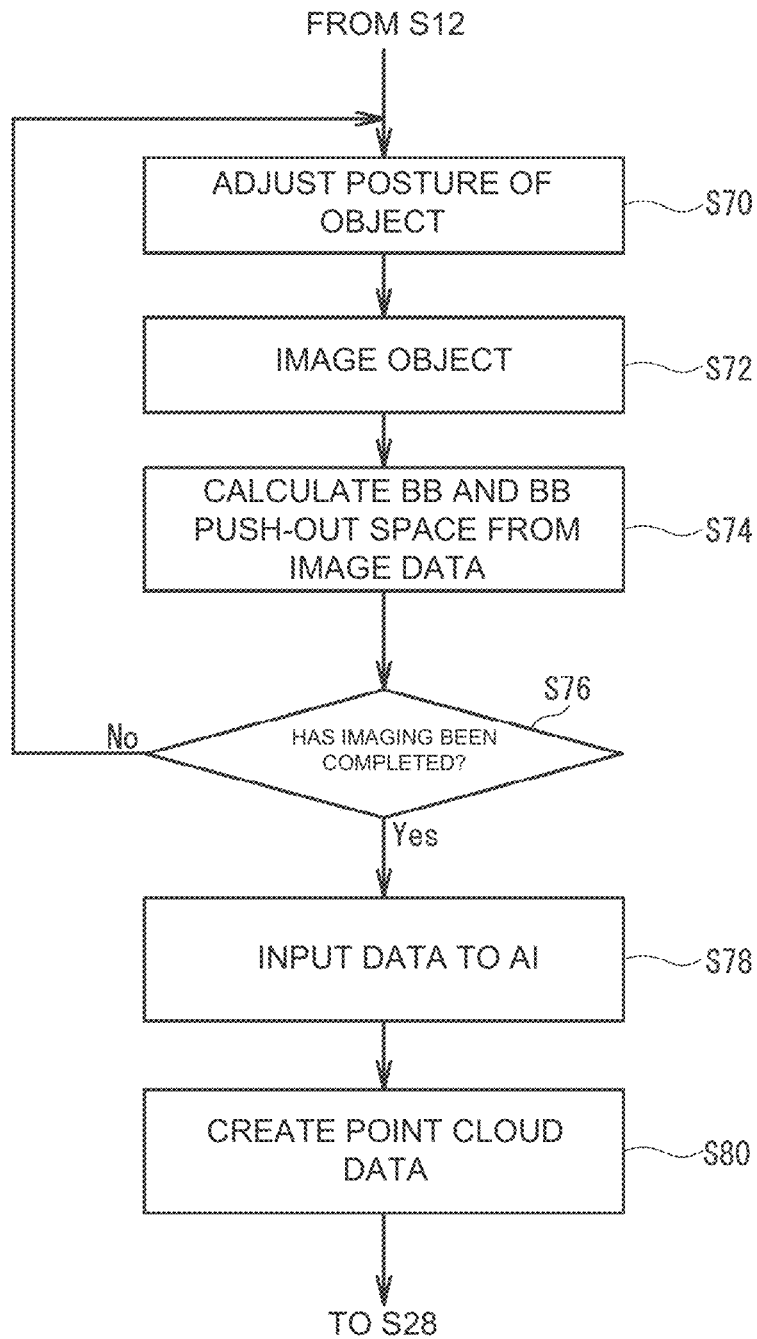
FIG. 18 is a flowchart showing still another example of the flow of the first half of the CAD data generation process.

When noise removal is performed by using the AI 60, steps S70 to S80 in FIG. 18 are executed instead of steps S14 to S26 in FIG. 14, for example. That is, the controller 12 images the object 100 while changing the posture of the object 100 (S70 and S72), and calculates the BB 50 and the BB push-out space 52 from the obtained brightness information 32 (S74). When the brightness information 32 of all surfaces is obtained, the controller 12 inputs to the AI 60 the obtained brightness information 32, the imaging position when each item of brightness information 32 is obtained, the BB 50 and the BB push-out space 52 of each item of brightness information 32 (S78). Thereafter, the point cloud data 40 is generated based on the output values output from the AI 60 (S80). Thereafter, the process proceeds to step S28 in FIG. 15.

As is apparent from the above description, by constructing the AI 60 that receives the first brightness information 32f and the second BB 50s as its inputs, and outputs the presence probability of an effective point for each pixel or grid space 46, it is possible to simplify the processing for generating the point cloud data 40 and the noise removal processing.

In addition, the configurations described so far are all examples, and other configurations may be changed as long as the point cloud data 40 is generated based on at least one or more brightness information 32 and one or more BB 50. For example, although the object 100 is attached to the machine tool 80 and the posture of the object 100 is changed by using the function of the machine tool 80 in this example, the object 100 may be held by an apparatus unrelated to the machine tool 80. In addition, instead of moving the object 100, the camera 24 may be moved. In addition, in the explanation so far, both the two-dimensional noise removal using the BB 50 and the three-dimensional noise removal using the BB push-out space 52 are performed. However, only one of the two-dimensional noise removal using the BB 50 and the three-dimensional noise removal using the BB push-out space 52 may be performed.

REFERENCE SIGNS LIST

10: Three-dimensional point cloud data processing system
12: Controller
14: Processor
16: Memory
18: Communication I/F
20: UI apparatus
22: Imaging unit
24: Camera
26: Light source
30: Image data
32: Brightness information
40: Point cloud data
44: CAD data
46: Grid space
50: BB
52: BB push-out space
62: Input layer
64: Intermediate layer
66: Output layer
80: Machine tool
81: Spindle
82: Numerical controller
84: Operation panel
100: Object

The invention claimed is:

1. A three-dimensional point cloud data processing system, comprising:
    one or more imaging devices that image an object to acquire one or more items of brightness information; and
    a controller that calculates three-dimensional point cloud data of the object from the one or more items of brightness information,
    wherein the controller calculates at least one bounding box (BB), which surrounds the object and is formed by combining one or more rectangles, from at least one of the one or more items of brightness information, and calculates the three-dimensional point cloud data based on the at least one BB and the one or more items of brightness information,
    wherein the one or more items of brightness information include a first brightness information obtained by imaging the object from a first direction and a second brightness information obtained by imaging the object from a second direction different from the first direction, and
    wherein the controller calculates a second BB surrounding the object and a second BB push-out space, which is obtained by pushing out the second BB in the second direction, from the second brightness information, and removes, as noise, points located outside the second BB push-out space among points calculated from the first brightness information.

2. The three-dimensional point cloud data processing system according to claim 1, wherein the one or more items of brightness information further include one or more items of additional brightness information, and the controller calculates the three-dimensional point cloud data based on one or more additional BBs calculated from the one or more items of additional brightness information, the second BB, and the first brightness information.

3. A three-dimensional point cloud data processing system, comprising:

one or more imaging devices that image an object to acquire one or more items of brightness information; and a controller that calculates three-dimensional point cloud data of the object from the one or more items of brightness information, wherein the controller calculates at least one BB, which surrounds the object and is formed by combining one or more rectangles, from at least one of the one or more items of brightness information, and calculates the three-dimensional point cloud data based on the at least one BB and the one or more items of brightness information, wherein the one or more items of brightness information include a first brightness information obtained by imaging the object from a first direction, and the controller calculates a first BB surrounding the object based on the first brightness information, removes, as noise, pixel values located outside the first BB among a plurality of pixel values forming the first brightness information, and calculates the three-dimensional point cloud data based on the first brightness information after noise removal.

4. A three-dimensional point cloud data processing system, comprising:

one or more imaging devices that image an object to acquire one or more items of brightness information; and a controller that calculates three-dimensional point cloud data of the object from the one or more items of brightness information, wherein the controller calculates at least one BB, which surrounds the object and is formed by combining one or more rectangles, from at least one of the one or more items of brightness information, and calculates the three-dimensional point cloud data based on the at least one BB and the one or more items of brightness information, wherein the controller functions as an AI that is machine-trained in advance to receive at least the at least one BB and the one or more items of brightness information as its inputs, and output information indicating presence or absence of an effective point in each of a plurality of pixels forming the one or more items of brightness information.

5. A three-dimensional point cloud data processing system, comprising:

one or more imaging devices that image an object to acquire one or more items of brightness information; and a controller that calculates three-dimensional point cloud data of the object from the one or more items of brightness information, wherein the controller calculates at least one BB, which surrounds the object and is formed by combining one or more rectangles, from at least one of the one or more items of brightness information, and calculates the three-dimensional point cloud data based on the at least one BB and the one or more items of brightness information, wherein the controller functions as an AI that is machine-trained in advance to receive at least the at least one BB and the one or more items of brightness information as its inputs, and output information indicating presence or absence of an effective point in each of a plurality of grid spaces formed by dividing a three-dimensional space in a 3D matrix.

* * * * *